(12) United States Patent
Senez

(10) Patent No.: US 9,359,050 B2
(45) Date of Patent: Jun. 7, 2016

(54) UNDERWATER CRAFT HAVING AN ELECTROCHEMICAL BATTERY

(75) Inventor: Thomas Senez, Sainte-Maxime (FR)

(73) Assignee: DCNS, Paris (FR)

( * ) Notice: Subject to any disclaimer, the term of this patent is extended or adjusted under 35 U.S.C. 154(b) by 61 days.

(21) Appl. No.: 14/129,322

(22) PCT Filed: Jul. 16, 2012

(86) PCT No.: PCT/EP2012/063891
§ 371 (c)(1),
(2), (4) Date: Feb. 26, 2014

(87) PCT Pub. No.: WO2013/010980
PCT Pub. Date: Jan. 24, 2013

(65) Prior Publication Data
US 2014/0193688 A1    Jul. 10, 2014

(30) Foreign Application Priority Data

Jul. 21, 2011   (FR) ..................... 11 56623

(51) Int. Cl.
| | |
|---|---|
| *B63G 8/08* | (2006.01) |
| *F42B 19/00* | (2006.01) |
| *F42B 19/24* | (2006.01) |
| *H01M 2/40* | (2006.01) |
| *H01M 6/34* | (2006.01) |
| *H01M 6/36* | (2006.01) |
| *G05D 7/01* | (2006.01) |

(52) U.S. Cl.
CPC . *B63G 8/08* (2013.01); *F42B 19/00* (2013.01); *F42B 19/24* (2013.01); *G05D 7/014* (2013.01); *H01M 2/40* (2013.01); *H01M 6/34* (2013.01); *H01M 6/36* (2013.01)

(58) Field of Classification Search
CPC ................. H01M 6/34; H01M 2300/0002
See application file for complete search history.

(56) References Cited

U.S. PATENT DOCUMENTS

| | | | |
|---|---|---|---|
| 3,154,040 A | 10/1964 | Neubert | |
| 3,959,023 A | 5/1976 | La Garde | |
| 5,506,065 A * | 4/1996 | Tribioli et al. | ............... 429/119 |
| 2007/0105460 A1 | 5/2007 | Vivien et al. | |

FOREIGN PATENT DOCUMENTS

| | | |
|---|---|---|
| EP | 0 669 666 | 8/1995 |
| FR | 1 457 287 | 1/1967 |
| FR | 2 862 433 | 5/2005 |

OTHER PUBLICATIONS

International Search Report dated Aug. 20, 2012, corresponding to PCT/EP2012/063891.

\* cited by examiner

*Primary Examiner* — Patrick Ryan
*Assistant Examiner* — Carmen Lyles-Irving
(74) *Attorney, Agent, or Firm* — Young & Thompson

(57) ABSTRACT

Disclosed is an underwater craft having an electrochemical battery activated by an electrolyte, including: an electrochemical cell; a tank (13) intended to contain the electrolyte; a seawater flow rate regulator (37) arranged upstream of the tank (13). The flow rate regulator includes: a fixed housing (60) including first ports (64); a slide (62) including second ports (66); the slide (62) being movable, in relation to the fixed housing (60), under the effect of the pressure of the seawater entering the regulator (37), to a balanced position in which the first and second ports (64, 66) define outlet openings (70) for seawater to flow to the tank (13), the slide (62) being movable between a maximum opening position, in which the area of the openings is at a maximum, and a maximum restriction position, in which the area of the openings (70) is at a minimum.

18 Claims, 3 Drawing Sheets

UNDERWATER CRAFT HAVING AN ELECTROCHEMICAL BATTERY

BACKGROUND OF THE INVENTION

1. Field of the Invention

The present invention relates to an underwater craft, in particular such as a torpedo, having an electrochemical battery activated by an electrolyte designed to produce the electrical energy for the underwater craft, the electrochemical battery including:
  an electrochemical cell for producing electricity;
  a tank intended to contain the electrolyte;
  at least one seawater intake duct emerging in the tank;
  a seawater flow rate regulator arranged upstream from the tank.

Such underwater crafts, for example consisting of a torpedo such as a so-called "heavyweight" torpedo, comprise an electrochemical battery activated by an electrolyte and that is intended to produce electricity for the rest of the craft for the operation, driving, etc. thereof.

Such electricity supply means for this type of craft are already known in the state of the art.

2. Description of the Related Art

Reference may thus for example be made to document FR-A-2,862,433, which describes an underwater craft provided with an electrochemical battery activated by an electrolyte. The electrochemical battery comprises an electrochemical electricity production cell, a tank intended to contain the electrolyte and means for circulating the electrolyte between the electrochemical cell and the tank. The electrolyte is stored in the tank in the anhydrous state. When the underwater craft is submerged, and following a water intake command, seawater from the surrounding aquatic environment is admitted into the tank by a seawater intake duct to dissolve the anhydrous electrolyte so as to form the liquid electrolyte.

Document FR-A-2,862,433 describes providing a flow rate regulator, designed to regulate the seawater flow rate entering the tank. This flow rate regulator comprises a prepositioning circuit that serves to regulate the restriction created by the flow rate regulator based on the submersion pressure prior to the admission of seawater into the intake duct.

Such a flow rate regulator is not fully satisfactory. In fact, it has been observed that at high submersion pressures, this flow rate regulator insufficiently regulates the seawater flow rate entering the tank. As a result, the seawater penetrates the tank at too high a flow rate, which creates a significant risk of deterioration of the members, in particular hydraulic members, arranged downstream from the flow rate regulator. This deterioration of the members downstream from the regulator creates a risk of sealing of the hydraulic loop by pieces of deteriorated members.

BRIEF SUMMARY OF THE INVENTION

One aim of the invention is to resolve these drawbacks and propose a device for regulating the seawater flow rate penetrating the battery section of an underwater craft that has a simple design and allows a reliable regulation of the seawater flow rate entering the tank irrespective of the submersion pressure.

To that end, the invention relates to an underwater craft of the aforementioned type, characterized in that the regulator comprises:
  a fixed housing comprising first ports;
  a slide comprising second ports;
the slide being movable, in relation to the fixed housing, in a movement direction under the effect of the pressure of the seawater entering the regulator against the bias exerted by elastic biasing means until it reaches a balanced position in which the first and second ports have coinciding areas defining outlet openings for seawater to flow toward the tank, the slide being movable between a maximum open position of the outlet openings, in which the area of the outlet openings is at a maximum, and a maximum restriction position of the outlet openings, in which the area of the outlet openings is at a minimum.

The underwater craft according to the invention may also comprise one or more of the following features, considered alone or according to all technically possible combination(s):
  the length of the second ports, taken in the direction of movement of the slide, is smaller than the length of the first ports, taken in the direction of movement of the slide;
  the first and second ports are each delimited by two first edges parallel to each other and to the movement direction of the slide, connected to each other by two second edges that are parallel to each other, the first edges of the first ports substantially coinciding with the first edges of the second ports;
  the electrochemical battery includes a single inlet for seawater from the surrounding aquatic environment;
  the elastic biasing means comprise a helical spring interposed between the slide and the housing and capable of recalling the slide toward its maximum opening position; and
  the underwater craft is formed by a torpedo.

BRIEF DESCRIPTION OF THE DRAWINGS

The invention will be better understood upon reading the following description, provided solely as an example and done in reference to the appended drawings, in which.

DETAILED DESCRIPTION OF THE PREFERRED EMBODIMENTS

Figure 1:
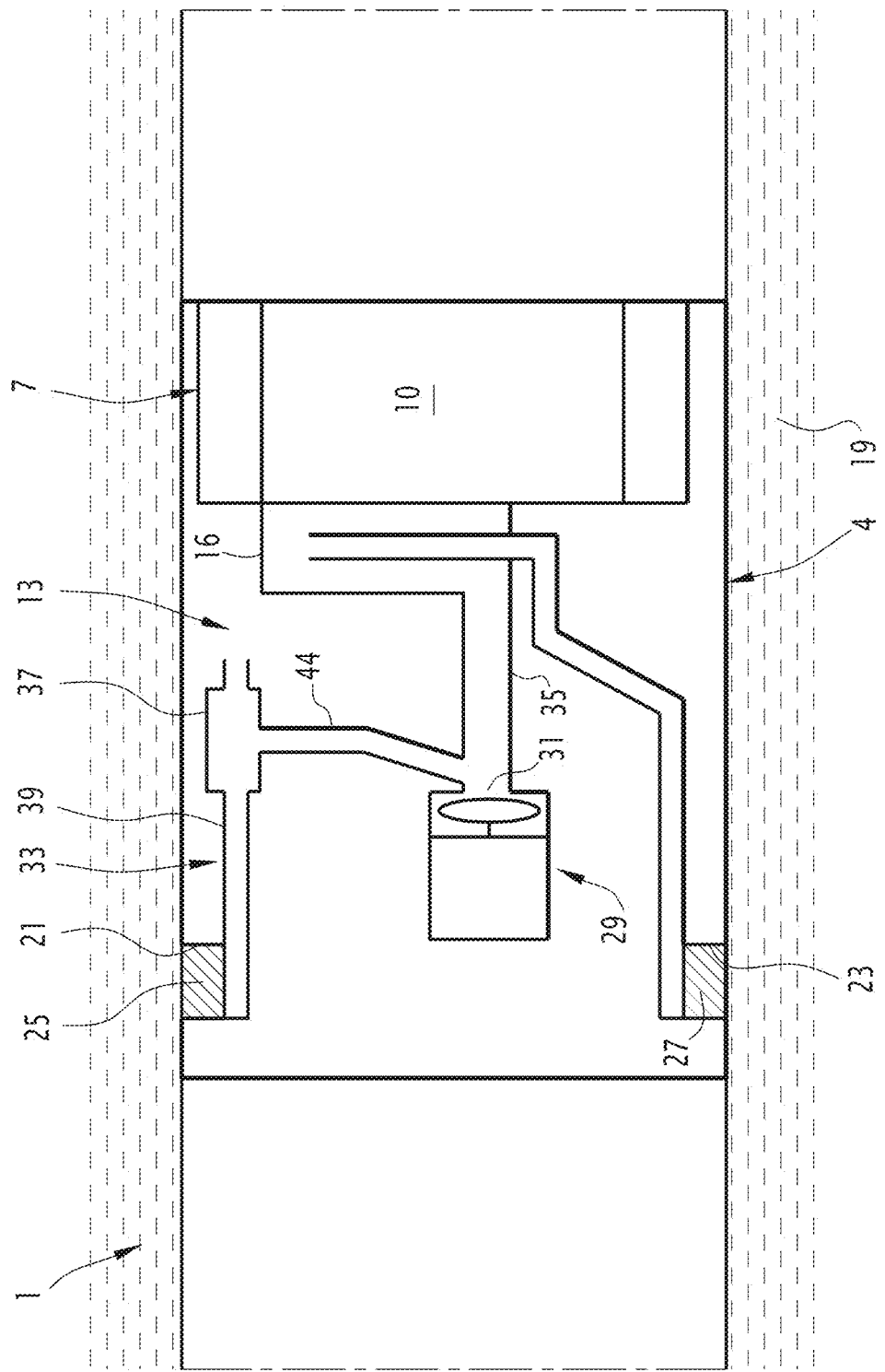
FIG. 1 is a block diagram illustrating the general structure of an electrochemical battery section included in the composition of an underwater craft according to the invention and comprising a flow rate regulator according to the invention.

These figures, and in particular FIG. 1, show a portion of an underwater craft 1, for example consisting of the so-called "heavyweight" torpedo. The portion of this craft 1 more particularly illustrated in the figures is the part of the battery section 4 of such a craft 1.

Traditionally and as described in the aforementioned prior document FR-A-2,862,433, the battery section 4 comprises an electrochemical battery 7 activated by an electrolyte and intended to produce electricity for powering the rest of the craft 1 for the operation, driving, etc. thereof.

This electrochemical battery 7 comprises an electrochemical cell 10 for producing electricity, associated with a tank 13 designed to contain the electrolyte. The electrolyte is stored in the tank 13 in anhydrous form. Traditionally, a gas separator 16 arranged at the outlet of the electrochemical cell 10 is capable of separating the liquid electrolyte leaving the electrochemical cell 10 from the gases produced by the electrolysis reaction in the electrochemical cell 10 and thus recycling the liquid electrolyte.

The electrochemical battery 7 communicates with the aquatic environment 19 surrounding the underwater craft 1 by means of an inlet orifice 21, capable of allowing seawater to enter the electrochemical battery 7 from the surrounding aquatic environment 19, and by means of a discharge orifice 23 for discharging the effluents coming from the electrochemical battery 7 toward the surrounding aquatic environment 19. The discharge orifice 23 serves to evacuate, from the electrochemical battery 7, the gases resulting from the electrochemical cell 10 and separated from the liquid electrolyte in the gas separator 16. The discharge orifice 23 is provided with a non-return valve that prohibits seawater from entering the electrochemical battery 7 from the surrounding aquatic environment 19 through the discharge orifice 23.

Before activation of the electrochemical battery 7, the inlet orifice 21 and the discharge orifice 23 are respectively sealably closed off by a first sealing member 25 and a second sealing member 27, for example formed by stoppers. The first and second sealing members 25, 27 ensure sealing of the tank 13 during all storage phases of the battery 7, as well as during the launch phase of the underwater craft 1.

Means for forming and circulating the liquid electrolyte are interposed between the inlet orifice 21 and the tank 13. They are capable of suctioning seawater from the surrounding aquatic environment 19 and discharging it into the tank 13 so as to dissolve the electrolyte in anhydrous form in order to form the liquid electrolyte upon priming the electrochemical battery 7. They are also capable of suctioning the liquid electrolyte coming from the gas separator 16 and discharging it into the tank 13 so as to allow the circulation thereof in a closed circuit in the electrochemical battery 7 between the electrochemical cell 10 and the tank 13.

In the illustrated embodiment, the means for forming and circulating the liquid electrolyte comprise a pump unit 29. A suction nozzle 31 of the pump unit 29 is connected to the inlet orifice 21 by an intake duct 33. It is further connected to the outlet of the gas separator 16 by a connecting duct 35.

The electrochemical cell 7 further comprises a flow rate regulator 37 capable of regulating the intake flow rate of the seawater in the tank 13 from the surrounding aquatic environment 19.

As illustrated in FIG. 1, the flow rate regulator 37 is arranged in the tank 13. It is situated hydraulically upstream from the inlet of the tank 13. It is in particular situated hydraulically downstream from the inlet orifice 21 at the intake duct 33. It is thus situated hydraulically upstream from the means for forming and circulating the electrolyte, in particular the pump unit 29. Thus, the seawater entering the electrochemical battery 7 through the inlet orifice 21 crosses through the flow rate regulator 37, where its flow rate is adjusted to a predetermined flow rate before penetrating the tank 13 with a flow rate substantially equal to the predetermined flow rate.

The flow rate regulator 37 is hydraulically connected to the intake duct 33. As illustrated in FIG. 1, the intake duct 33 comprises an inlet tubing 39 connecting the inlet orifice 21 to an inlet of the flow rate regulator 37, and an outlet tubing 44 connecting an outlet of the flow rate regulator 37 to the means for forming and circulating liquid electrolyte, in particular to the suction nozzle 31 of the pump unit 29.

Figure 2:
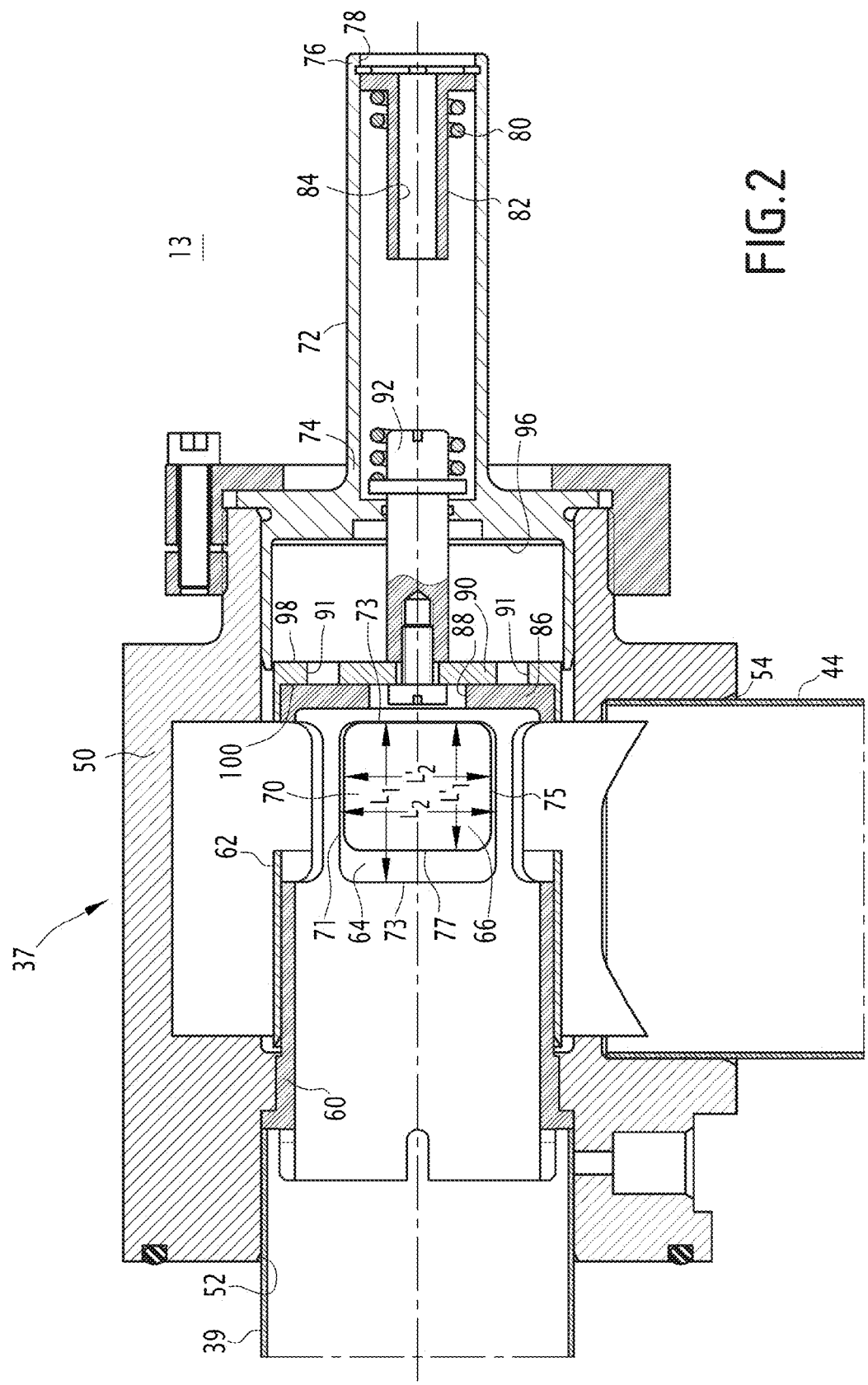
FIG. 2 is a cross-sectional view of the flow rate regulator of FIG. 1 in a maximum opening configuration.
Figure 3:
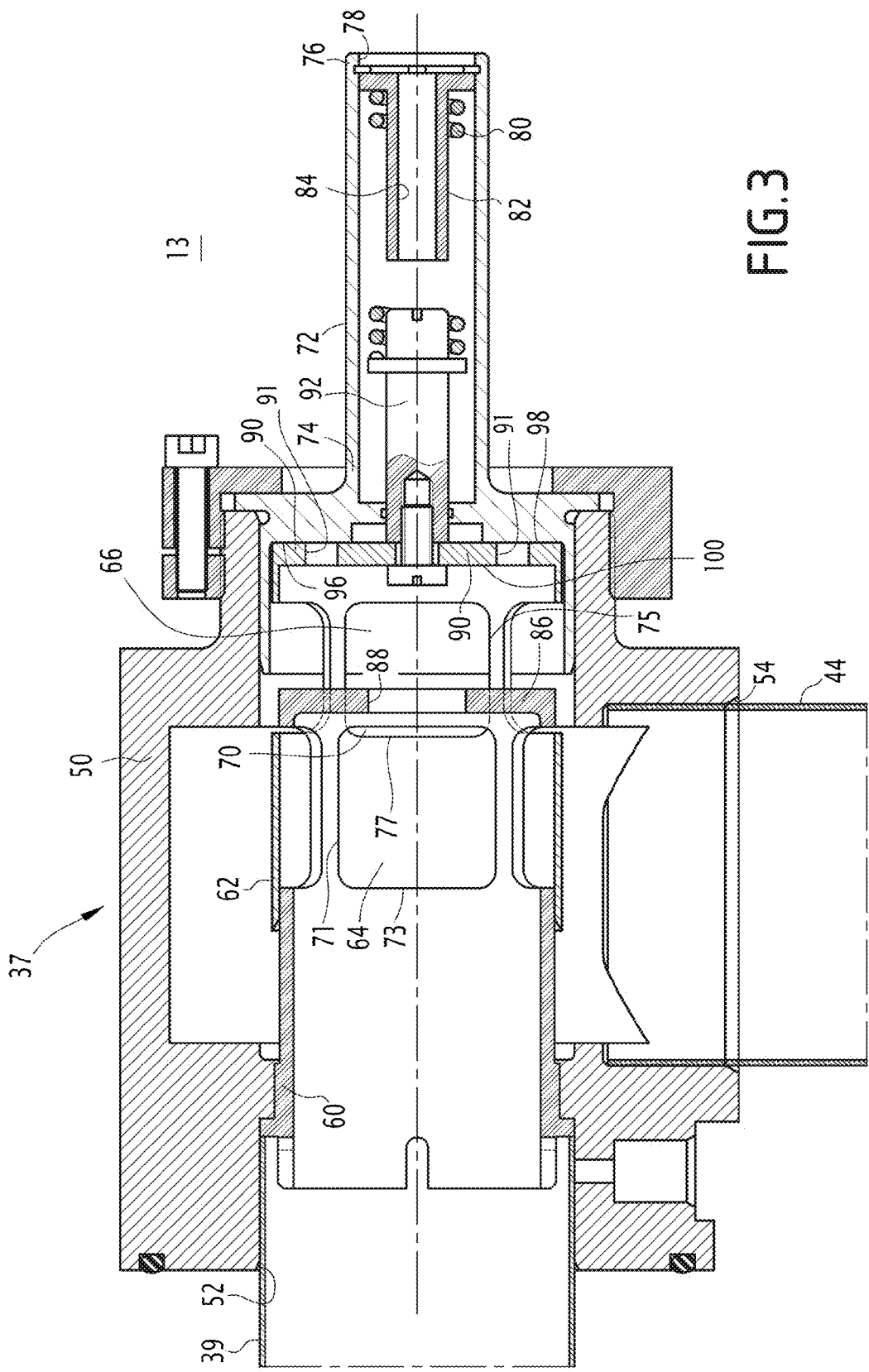
FIG. 3 is a cross-sectional view of the flow rate regulator of FIG. 1 in a maximum restriction configuration.

The flow rate regulator 37 is illustrated in more detail in FIGS. 2 and 3. It comprises a regulating assembly comprising a stationary housing 60 and a moving slide 62, each equipped with ports 64, 66, respectively extending through a circumferential wall of the housing 60 and through a circumferential wall of the moving slide 62. The regulating assembly is arranged in a body 50 fixed in the tank 13. The housing 60 is stationary relative to the body 50. The regulating assembly includes seawater outlet openings 70, each corresponding to a coinciding area between a port 64 of the housing 60 and a port 66 of the moving slide 62.

The housing 60 and the moving slide 62 are capable of cooperating with each other to regulate the seawater flow rate exiting the flow rate regulator 37 and penetrating the tank 13 by adjusting the area of the outlet openings 70 of the regulating assembly. To that end, the moving slide 62 can be axially translated on the housing 60 in an axial movement direction under the effect of the pressure exerted by the seawater entering the flow rate regulator 37 against elastic biasing means until a balanced position is reached. The moving slide 62 is in particular movable relative to the housing 60 between two extreme balanced positions, a maximum opening position (FIG. 2) and a maximum restriction position (FIG. 3). These two extreme balanced positions each correspond to an abutment of the moving slide 62 in the movement direction. The elastic biasing means are interposed between the moving slide 62 and the housing 60. They are capable of recalling the moving slide 62 toward its maximum opening position.

The movement of the moving slide 62 relative to the housing 60 creates a variation in the area of the outlet openings 70 of the regulating assembly. In the balanced position of the moving slide 62, the outlet openings 70 have an area that depends on the pressure of the water entering the flow rate regulator 37. This area is suitable for creating the predetermined outlet flow rate of the seawater toward the tank 13 as a function of the pressure of the water entering the flow rate regular 37. In particular, the area of the outlet openings 70 of the regulating assembly decreases over the course of the movement of the moving slide 62 from its maximum opening position to its maximum restriction position. Thus, the area of the outlet openings 70 is maximal in the maximum opening position. It is minimal in the maximum restriction position.

Each port 64 of the housing 60 is delimited by two first edges 71 and two second edges 73. The second edges 73 connect the first edges 71 to each other. The first edges 71 are substantially parallel to each other. They are furthermore substantially parallel to the direction of movement of the moving slide 62. The second edges 73 form curves parallel to each other. Projected in a plane passing through the two first edges 71, the length L1 of the first edges 71 is substantially equal to the length L2 of the second edges 73. In particular, projected in the plane passing through the two first edges 71, the difference between the length L1 of the first edges 71 and the length L2 of the second edges 73 is less than 10%, in particular less than 7.5%. Projected in the plane passing through the two first edges 71, the ports 64 of the housing 60 have a substantially square shape.

Similarly, each port 66 of the moving slide 62 is delimited by two first edges 75 and two second edges 77. The second edges 77 connect the first edges 75 to each other. The first edges 75 are substantially parallel to each other. They are furthermore substantially parallel to the direction of movement of the moving slide 62. The second edges 77 form curves that are parallel to each other. Projected in a plane passing through the two first edges 75, the length L'1 of the first edges 75 is in particular strictly smaller than the length L'2 of the second edges 77. Projected in the plane passing through the two first edges 75, the ports 66 of the moving slide 62 have a substantially rectangular shape.

The length $L'_1$ of the first edges 75 of the ports 66 of the moving slide 62 is strictly smaller than the length $L_1$ of the first edges 71 of the ports 64 of the housing 60. In particular, it is at least 17% smaller, in particular at least 19% smaller than the length $L_1$ of the first edges 71 of the ports 64 of the housing 60.

The first respective edges 71, 75 of the ports 64 and 66 substantially coincide.

The area of the ports 66 of the moving slide 62 is advantageously smaller than that of the ports 64 of the housing 60.

The length $L'_1$ of the first edges 75 of the ports 66 of the moving slide 62 has been chosen such that the outlet openings 70 are practically closed in the maximum restriction position of the moving slide 62 (FIG. 3), i.e., such that the area of the outlet openings 70 is very small. Thus, when the hydraulic pressure is high, the pressure loss at the outlet openings 70 is high and the outlet flow rate of the regulator 37 is limited.

As illustrated in FIGS. 2 and 3, the body 50 comprises an inlet orifice 52 connected to the inlet tubing 39 of the intake duct 33 and an outlet orifice 54 connected to the outlet tubing 44 of the intake duct 33. The inlet orifice 52 and the outlet orifice 54 each extend substantially in a middle plane. The central axis of each orifice 52, 54 is defined as the axis passing through the geometric center of the orifice 52, 54 and substantially perpendicular to the middle plane of the orifice 52, 54. As illustrated in FIGS. 2 and 3, the central axis of the inlet orifice 52 is substantially perpendicular to the central axis of the outlet orifice 54. At the junction with the body 50 of the flow rate regulator 37, the inlet tubing 39 and the outlet tubing 44 extend along axes that are substantially perpendicular to each other. The body 50 extends in an elongation direction substantially combined with the central axis of the inlet orifice 52.

In the continuation of the description, "proximal" describes the part of an element closest to the inlet orifice 52 and "distal" describes the part of an element furthest from the inlet orifice 52 in the direction of elongation of the body 50.

The body 50 extends at its distal end by a hollow elongated sleeve 72, for example substantially cylindrical. The hollow elongated sleeve 72 comprises a proximal end 74 connected to the body 50 and a free distal end 76. The inside of the hollow elongated sleeve 72 communicates with the tank 13 by means of an orifice 78 formed at the free end 76. The elastic biasing means are arranged in that sleeve 72. In the illustrated embodiment, the elastic biasing means are formed by a helical compression spring 80.

Optionally, a rod 82 for fastening and guiding the elastic biasing means, for example substantially cylindrical, is inwardly fixed at the free end 76 of the sleeve 72 and extends toward the connected proximal end 74. The fastening and guiding rod 82 is coaxial to the sleeve 72. It is hollow and comprises an inner passage 84 emerging in the tank 13 through the orifice 78. Thus, the flow rate regulator 37 communicates with the tank 13 by means of the orifice 78. On the proximal side, the inner passage 84 emerges in the inner space of the sleeve 72.

A distal part of the spring 80 is engaged on the fastening and guide rod 82 and a distal end of the spring 80 is fastened at the distal end of the rod 82. The length of the fastening and guide rod 82 is chosen such that the rod 82 is capable of guiding the spring 80 during its compression so as to avoid torsion thereof.

The housing 60 and the moving slide 62 extend in respective elongation directions that are substantially aligned with the elongation axis of the body 50 and with the sliding direction of the moving slide 62. The moving slide 62 outwardly surrounds part of the housing 60 and slides thereon. Said housing 60 and the moving slide 62 are for example formed by two substantially coaxial hollow cylinders open at their proximal end. At its distal end, the housing 60 comprises a bottom 86 provided with a through orifice 88. The through orifice 88 is in particular formed at the center of the bottom 86. The moving slide 62 is closed at its distal end by a bottom 90. In the illustrated embodiment, the bottom 90 comprises through openings 91 through which the air present between the bottom 90 of the moving slide 62 and the body 50 when the moving slide 62 moves toward its maximum restriction position is evacuated. The moving slide 62 is distally extended by a rod 92 that protrudes in the sleeve 72. The rod 92 is secured to the moving slide 62. It is for example fixed on the bottom 90 of the moving slide 62 using any suitable fastening means, in particular by screwing.

A proximal part of the spring 80 is engaged on the distal part of the rod 92, and a proximal part of the spring 80 is fastened to that distal part of the rod 92. Thus, the spring 80 is fixed on the one hand to the guide and fastening rod 82, which is stationary relative to the body 50, and therefore relative to the housing 60, and on the other hand to the rod 92, which is secured to the moving slide 62.

The movement of the moving slide 62 toward its maximum restriction position creates a translation of the rod 92 in the sleeve 72 and, consequently, causes the distal end of the rod 92 to be brought closer to the guide and fastening rod 82. The spring 80 is then compressed. In the maximum restriction position (FIG. 3), the bottom 90 of the moving slide 62 is separated from the bottom 86 of the housing 60. It distally abuts against an abutment surface 96 formed in the body 50. A distal face 98 of the bottom 90 then abuts against the abutment surface 96.

In the maximum opening position (FIG. 2), the bottom 90 of the moving slide 62 proximally abuts against the bottom 86 of the housing 60. A proximal face 100 of the bottom 90 then abuts against the bottom 86 of the housing 60.

The movement of the moving slide 62 from its maximum opening position to its maximum restriction position corresponds to a movement of the moving slide 62 toward the distal end of the body 50.

The operation of the flow rate regulator 37 will now be explained.

Initially, i.e., for activation of the battery 7, the moving slide 62 is in its maximum opening position abutting against the bottom 86 of the housing 60. The pressure in the tank 13 is substantially equal to the atmospheric pressure.

Upon activation of the battery 7, after the launch phase of the craft 1, the first sealing member 25 is open, for example by means of a pyrotechnic actuator. The seawater from the surrounding aquatic environment 19 then penetrates the intake duct 33 at a pressure substantially equal to the submersion pressure of the craft 1. It next penetrates the housing 60 through the intake tubing 39 at a pressure equal to the submersion pressure. It next passes through the orifice 88 formed in the bottom 86 of the housing 60 and exerts a pressure oriented in the direction of movement of the moving slide 62 on the proximal face 100 of the bottom 90 of the moving slide 62. The pressure exerted on the moving slide 62 depends on the submersion pressure. Under the effect of that pressure, the moving slide 62 moves toward the distal end of the body 50 against elastic biasing means until it reaches a balanced position. The movement distance of the moving slide 62 from the maximum open position depends on the pressure exerted by the seawater on the moving slide 62 and therefore the submersion pressure.

The movement of the moving slide 62 relative to the housing 60 creates the movement of the ports 66 of the moving slide 62 relative to the ports 64 of the housing 60, and thus a decrease in the area of the outlet openings 70. This decrease is proportional to the movement of the moving slide 62 and therefore the submersion pressure. In the balanced position of the moving slide 62, the area of the outlet openings 70 is such that the flow rate of seawater radially exiting through the outlet openings 70 is equal to the desired predetermined flow rate at the outlet of the flow rate regulator 37. The seawater exiting through the outlet openings 70 leaves the flow rate regulator 37 through the outlet tubing 44. It is then suctioned by the suction nozzle 31 of the pump unit 29 and discharged into the tank 13, which it gradually fills.

The flow rate regulator 37 according to the invention does not comprise a prepositioning circuit. The movement of the moving slide 62 to its balanced position is created directly by the pressure of the seawater penetrating the flow rate regulator 37 from the inlet orifice 21.

Eliminating the prepositioning circuit creates the following advantages. It is possible to provide only a single seawater inlet orifice in the flow rate regulator, namely the inlet orifice 21, whereas in the presence of a prepositioning circuit, it was necessary to provide a prepositioning orifice dedicated to the prepositioning circuit making it possible to acquire the submersion pressure next applied to the slide of the flow rate regulator for the prepositioning thereof. The elimination of this prepositioning orifice emerging in the surrounding aquatic environment guarantees better sealing of the battery section of the underwater craft.

Furthermore, eliminating the prepositioning circuit also creates a decrease in the mass and bulk of that part of the battery.

Lastly, in the presence of the prepositioning circuit, it was necessary to provide a wall of the body of the flow rate regulator, between the abutment surface of the body and the hollow sleeve, thick enough to house part of the prepositioning circuit therein. Eliminating the prepositioning circuit makes it possible to decrease the thickness of that wall while preserving the total length of the flow rate regulator. It thus becomes possible to increase the travel of the slide and thereby increase the high-pressure submersion restriction so as to preserve a substantially constant outlet flow rate irrespective of the submersion pressure.

The particular form of the ports makes it possible to obtain a clean regulation of the flow rate. Furthermore, the fact that the length of the ports of the slide is smaller than that of the ports of the housing makes it possible to obtain a better restriction at a high submersion pressure than the regulators of the state of the art.

The shape of ports of the housing and the moving slide is chosen so as to obtain a good regulation of the flow rate both at a low submersion pressure and a high submersion pressure in light of the increase in the travel of the moving slide, made possible by the elimination of the prepositioning slide.

The invention claimed is:

1. An underwater craft (1), comprising:
an electrochemical battery (7) comprised of
an electrochemical cell (10) for producing electricity for the underwater craft (1);
a tank (13) having an inlet;
an electrolyte contained in the tank (13), the electrolyte being in anhydrous form, the electrolyte activating the electrochemical battery (7) to produce the electricity for the underwater craft (1);
a seawater intake duct (33) having an inlet orifice (21) that allows seawater to enter the electrochemical battery (7), the seawater intake duct (33) emerging in the tank (13); and
a seawater flow rate regulator (37) arranged hydraulically upstream of the inlet of the tank (13) and downstream from seawater inlet orifice (21) of the intake duct (33), the seawater flow rate regulator (37) regulating an intake flow rate of the seawater in the tank (13) to a predetermined flow rate, the seawater flow rate regulator (37) being comprised of:
a fixed housing (60) comprising a first port (64) extending through a circumferential wall of the fixed housing (60),
a slide (62) comprising a second port (66) extending through circumferential wall of the slide (62), and
an elastic biasing element (80),
the slide (62) being movable, in relation to the fixed housing (60), in a movement direction under effect of pressure of the seawater entering the seawater flow rate regulator (37) against a bias exerted by the elastic biasing element (80) until the slide reaches a balanced position in which the first and second ports (64, 66) have coinciding areas defining seawater outlet openings (70) for seawater to flow toward the tank (13), the area of the outlet openings (70) in the balanced position depending on the pressure of the seawater entering the flow rate regulator (37), the slide (62) being movable between a maximum open position of the outlet openings (70), in which an area of the outlet openings (70) is at a maximum, and a maximum restriction position of the outlet openings (70), in which the area of the outlet openings (70) is at a minimum,
wherein the fixed housing (60) and the movable slide (62) cooperate with each other to regulate the seawater flow rate exiting the seawater flow rate regulator (37) and penetrating the tank (13) by adjusting the area of the outlet openings (70) such that in the balanced position, the area of the outlet openings (70) regulates the seawater flow rate exiting the seawater flow rate regulator (37) and thereby regulates the intake flow rate of the seawater entering into the tank (13) to the predetermined flow rate.

2. The underwater craft (1) according to claim 1, wherein the length of the second port (66), taken in the direction of movement of the slide (62), is smaller than the length of the first port (64), taken in the direction of movement of the slide (62).

3. The underwater craft (1) according to claim 1, wherein the first and second ports (64, 66) are each delimited by two first edges (71, 75) parallel to each other and to the movement direction of the slide (62), connected to each other by two second edges (73, 77) that are parallel to each other, the first edges (71) of the first ports (64) coinciding with the first edges (75) of the second ports (66).

4. The underwater craft (1) according to claim 1, wherein the electrochemical battery (7) includes a single inlet (21) for seawater from the surrounding aquatic environment (19).

5. The underwater craft (1) according to claim 1, wherein the elastic biasing element comprises a helical spring (80) interposed between the slide (62) and the housing (60) and capable of recalling the slide (62) toward its maximum open position.

6. The underwater craft (1) according to claim 2, wherein the first and second ports (64, 66) are each delimited by two first edges (71, 75) parallel to each other and to the movement direction of the slide (62), connected to each other by two second edges (73, 77) that are parallel to each other, the first edges (71) of the first ports (64) coinciding with the first edges (75) of the second ports (66).

7. The underwater craft (1) according to claim 2, wherein the electrochemical battery (7) includes a single inlet (21) for seawater from the surrounding aquatic environment (19).

8. The underwater craft (1) according to claim 3, wherein the electrochemical battery (7) includes a single inlet (21) for seawater from the surrounding aquatic environment (19).

9. The underwater craft (1) according to claim 2, wherein the elastic biasing element comprises a helical spring (80) interposed between the slide (62) and the housing (60) and capable of recalling the slide (62) toward its maximum open position.

10. The underwater craft (1) according to claim 3, wherein the elastic biasing element comprises a helical spring (80) interposed between the slide (62) and the housing (60) and capable of recalling the slide (62) toward its maximum open position.

11. The underwater craft (1) according to claim 4, wherein the elastic biasing element comprises a helical spring (80) interposed between the slide (62) and the housing (60) and capable of recalling the slide (62) toward its maximum open position.

12. The underwater craft (1) according to claim 2, wherein the underwater craft (1) is a torpedo.

13. The underwater craft (1) according to claim 3, wherein the underwater craft (1) is a torpedo.

14. The underwater craft (1) according to claim 6, wherein the electrochemical battery (7) includes a single inlet (21) for seawater from the surrounding aquatic environment (19).

15. The underwater craft (1) according to claim 6, wherein the elastic biasing element comprises a helical spring (80) interposed between the slide (62) and the housing (60) and capable of recalling the slide (62) toward its maximum open position.

16. The underwater craft (1) according to claim 7, wherein the elastic biasing element comprises a helical spring (80) interposed between the slide (62) and the housing (60) and capable of recalling the slide (62) toward its maximum open position.

17. The underwater craft (1) according to claim 8, wherein the elastic biasing element comprises a helical spring (80) interposed between the slide (62) and the housing (60) and capable of recalling the slide (62) toward its maximum open position.

18. The underwater craft (1) of claim 1, wherein the underwater craft (1) is a torpedo.

* * * * *